(12) United States Patent
Nakazawa et al.

(10) Patent No.: US 7,001,271 B2
(45) Date of Patent: Feb. 21, 2006

(54) VIDEO GAME WITH QUICK ALTERNATION OF PLAYER CHARACTERS

(75) Inventors: Takatsugu Nakazawa, Tokyo (JP); Masaki Kobayashi, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 178 days.

(21) Appl. No.: 09/964,793

(22) Filed: Sep. 28, 2001

(65) Prior Publication Data

US 2002/0142817 A1   Oct. 3, 2002

(30) Foreign Application Priority Data

Mar. 29, 2001   (JP)   ............................. 2001-097148

(51) Int. Cl.
*A63F 13/00*   (2006.01)

(52) U.S. Cl. ......................................................... 463/7
(58) Field of Classification Search ................ 463/1–9, 463/30–32, 36–38, 40–43; 273/236, 237, 273/244–247, 259, 292, 298, 308
See application file for complete search history.

(56) References Cited

U.S. PATENT DOCUMENTS

| | | | | |
|---|---|---|---|---|
| 6,106,399 A | * | 8/2000 | Baker et al. ................... | 463/42 |
| 6,299,535 B1 | | 10/2001 | Tanaka | |
| 6,347,994 B1 | * | 2/2002 | Yoshikawa et al. ............ | 463/7 |
| 6,475,084 B1 | * | 11/2002 | Tanibuchi et al. ............. | 463/3 |
| 2002/0142833 A1 | * | 10/2002 | Tsuchida et al. .............. | 463/30 |

FOREIGN PATENT DOCUMENTS

| | | |
|---|---|---|
| JP | 2000107463 | 4/2000 |
| JP | 2001097148 | 11/2001 |

OTHER PUBLICATIONS

Dan Gonzales, Dragon Quest IV (NES) Manual, (Jun. 4, 2003), downloaded from Internet webpage http://gamespot-.com/nes/rpg/dragonquest4 on Sep. 29, 2003, pp. 1-11.*
Dragon Warrior IV (2003), downloaded from http://gamefaqs.com/console/nes/data/7690.html on Sep. 30, 2003, p. 1.*
Cumulative references to The Lost Vikings by Blizzard Entertainment or Norse by Norse West by Interplay as reported at website (www.mobygames.com/games/sheet/gameld%2C1547) including The Lost Vikings game description, Series and complete release, 8 pages.*
The Lost Vikings instruction manual found at http://www.replacementdocs.com, 16 pages, copyright 1993.*
English Language Abstract for JP Appln. No. 2000-10763.

(Continued)

*Primary Examiner*—M. A. Sager
(74) *Attorney, Agent, or Firm*—Greenblum & Bernstein, P.L.C.

(57) ABSTRACT

Player characters can participate, quickly as alternated, in a battle while simplifying the alternating procedure. At the instant of a transfer to an acceptance of decisions on the player characters and actions, a standby state continues until a button is pushed, until an X-button is pushed, or until the actions for the player characters to execute are selected. When the button is pushed, a list of standby player characters is displayed to display the character names and characteristics of the characters. When the selections of the relief characters are received and selected by the player, the characters are alternated. When the X-button is pushed, the character alternations are restored. When the actions for the player characters to execute are selected, moreover, the operations for executing the decided actions are executed to end a series of player characters and the acceptance of the action decisions.

32 Claims, 5 Drawing Sheets

OTHER PUBLICATIONS

"Jump Comics Selection, Fami-Com Ougi Daizensho (Family Computer Complete Secrets), Dragon Quest IV Michibikareshi Monotachi", Kabushiki Kaisha Home Sha, Feb. 26, 1990, pp. 24-27, together with a partial English Language Translation.

"Konami Kanpeki Kouryaku Series Jikkyo Powerful Pro Yakyu 4 Koushiki Kanzen Guide Book (Konami Perfect Attack Series, Play-by-Play Powerful Professional Baseball 4, Official Perfect Guide Book)", Konami, Mar. 20, 1997, pps. 9 and 29 together with a partial English Language Translation.

* cited by examiner

VIDEO GAME WITH QUICK ALTERNATION OF PLAYER CHARACTERS

CROSS REFERENCE TO RELATED APPLICATION

The present disclosure relates to subject matter contained in Japanese Patent Application No. 2001-097148, filed on Mar. 29, 2001, the disclosure of which is expressly incorporated herein by reference in its entirety.

BACKGROUND OF THE INVENTION

1. Field of the Invention

The present invention relates to a video game for controlling a battle scene on a screen between multiple player characters and at least one enemy character. The invention additionally relates to a computer-readable recording medium having such a program of a video game recorded to allow multiple players to participate in the video game through a network and to control a battle scene on a screen between multiple player characters and at least one enemy character.

2. Related Art

As one genre of a video game using a computer, there is known a role-playing game (as will be referred to as the "RPG"). In a RPG, a character usually plays a role in a game in place of a player so that the player develops a story while experiencing a simulated adventure through the character (the "player character") operated by the player. In most cases, individual set zones to be formed in a virtual space are set with characters (as will be called the "enemy characters") to fight against the player characters. These player characters proceed to the individual zones so that they fight against the enemy characters opposing the achievement of an objective in the story. This story is developed when the player character defeats the enemy.

Here, the player character is operated by using buttons on a keypad or a joy stick. In response to keypad operation, the player character is moved to perform a predetermined action. To progress the story, a number of events such as battle scenes are arranged. The game progresses by selections in these events.

In the battle scene of the video game of the prior art, on the other hand, the player character and the enemy character fight one-on-one. In order to enhance the interest better, however, there has also been proposed a video game in which player characters and enemy characters battle each other. In this video game case in which the play characters and the enemy characters fight in a common display screen, the actions (or commands) of the individual player characters are separately set at first so that the actions of the individual characters are executed all at once by completing the settings of all the characters. In the video game in which the characters can battle, on the other hand, there has also been proposed a video game in which some standbys of the player characters do not participate in the battle so that the battling player characters and the standby player character are alternated, if necessary.

In the video game of the prior art, however, the player characters and the standby player character cannot quickly participate, when alternated, if necessary. In addition, the operation of the alternating means may be so complicated that the game fails to operate smoothly and players lose their interest. Hence, there has been desired a video game in which player characters and a standby player character can quickly participate, when alternated, and in which the alternation procedure is so simple that a player is less likely to lose interest.

SUMMARY OF THE INVENTION

The present invention has been conceived in view of the problems, thus far described, and has an object to provide a computer-readable recording medium having a video game program that allows player characters and a standby player character to quickly participate, when alternated, in a game scenario such as a battle. The alternation is a simple procedure to help prevent a player from losing interest. The invention includes embodiments in the form of a program of a video game, a video game processing method and a video game processing apparatus.

In order to solve the aforementioned problems and to achieve the above-specified objective, a first aspect of the invention provides a computer-readable recording medium having a video game program to control a battle scene on a screen between multiple player characters and at least one enemy character. The program causes a computer to allow some of said multiple player characters to participate in a scene such as a battle and to display a list of standby player characters not participating in the scene in a subscreen. The participating and non-participating character activities respond to the operation of the player where any of the play characters participating in the scene is awaiting a command input. The program also causes the computer to select any of the player characters displayed in the subscreen in response to the operation of the player and to substitute an optionally selected player character for said player character awaiting the command input by exchanging the participating character and the standby character.

According to this first aspect of the invention, it is also possible to provide a recording medium including a program, in which the procedure to alternate the player characters in the state awaiting the command input is accepted so that after the character alternations the characters can instantly participate, after alternated, in the scene to help prevent a player from losing interest.

Furthermore, according to this first aspect, in a scene such as a battle, the player characters may accept the command input in accordance with the orders and in response to the operation of the player. As a result, it is possible to provide a recording medium, including a program, which can select the actions for the individual player characters to execute and which can make finer settings and fight a more systematic battle.

According to the first aspect, moreover, the information of the player characters may be displayed in a list on a subscreen. Alternatively, information of the player characters displayed in the list on the subscreen may be the player character names and the bodily powers and the magical powers of the player characters. As a result, it is possible to provide a recording medium with a program which can notify the player properly of the information necessary for investigating the alternations of the player characters.

Furthermore, according to the first aspect, the recorded program may further cause a computer to restore positions of alternated characters between participating and standby characters for a scene such as a battle scene in response to the operation of a player after alternations. As a result, it is possible to provide a recording medium with a program which can proceed the character alternations smoothly and easily.

According to the first aspect, moreover, the recorded program may further cause a computer to allow the actions of a player having participated in a scene such as a battle scene by using alternations, when the alternations are completed. It is possible to provide a recording medium, including a program, which allows the player character, as alternated to participate in the scene, to act and to instantly participate in the scene so that a player's interest can be prevented from lessening.

Furthermore, according to the first aspect, the recorded program may further cause a computer to display the action orders of all the characters including player characters and an enemy character participating in a scene such as a battle scene. As a result, it is possible to provide a recording medium, including a program, which allows the player characters to transition smoothly and strategically as the scene develops by making the best use of the individual features of the player characters.

According to a second aspect of the invention, there is provided a program of a video game for controlling a scene such as a battle scene on a screen between multiple player characters and at least one enemy character. The program causes a computer to allow some of the player characters to participate in the battle scene and to display a list of standby player characters not participating in the scene in a subscreen. The display of participating and non-participating characters is in response to the operation of a player, where any of the player characters participating in the scene is awaiting a command input. The program also allows a player to select any of the player characters displayed in the subscreen in response to the operation of the player and to substitute an optionally selected player character for the player character. This is done while the player character is awaiting the command input to exchange the participating character with the standby character in the scene.

According to this second aspect, the procedure to alternate player characters in a scene, such as a battle, includes a next state awaiting the acceptance of command input so that after the characters alternate, the characters can instantly participate in the scene to prevent a player's interest from lessening.

Furthermore, according to this second aspect, in a scene such as a battle scene, player characters may accept a command input in accordance with orders and in response to the operation of a player. As a result, it is possible to select the actions for the individual player characters to execute thereby making finer settings and to participate in a more systematic scene.

According to the second aspect, moreover, information of player characters may be displayed in a list on a subscreen. Alternatively, information of the player characters displayed in the list on the subscreen may be the player character names and the bodily powers and the magical powers of the player characters. As a result, it is possible to notify the player properly of the information necessary for investigating the alternations of the player characters.

Furthermore, according to the second aspect, the program may further cause a computer to restore the positions of alternated characters between the participation in and standby player characters for a scene such as a battle in response to the operation of a player after the alternations. As a result, it is possible to proceed with the character alternations smoothly and easily.

According to the second aspect, moreover, the program may further cause a computer to allow actions of a player participating in a scene such as a battle by said alternations, when the alternations are completed. It is possible to allow a player character, as alternated to participate in the battle, to act and to instantly participate in a scene so that a player's interest can be prevented from lessening.

Furthermore, according to the second aspect, the program may further cause a computer to display the action orders of all characters including player characters and an enemy character participating in a scene such as a battle. As a result, it is possible to allow the player characters to transition smoothly and strategically as the scene develops by making the best use of the individual features of the player characters.

According to a third aspect of the invention, there is provided a video game processing method for controlling a scene such as a battle scene on a screen between multiple player characters and at least one enemy character. The method allowing at least one player character to participate in the scene and displaying a list of standby player characters not participating in the scene in a subscreen in response to the operation of a player while any of the player characters participating in said battle scene is awaiting a command input. The method also includes selecting any of the player characters displayed in the subscreen in response to the operation of the player and substituting the optionally selected player character for the player character awaiting the command input in exchanging the participation in and the standby player characters for the scene.

According to this third aspect, the procedure to alternate player characters in a state awaiting command input is accepted so that after the characters alternate, the characters can instantly participate in a scene such as a battle scene to prevent a player's interest from lessening.

According to this third aspect, in a scene such as a battle scene, player characters may accept command input in accordance with orders and in response to operation of a player. As a result, it is possible to select actions for the individual player characters to execute, thereby, to make finer settings and to participate in a more systematic scene.

According to the third aspect, moreover, information of player characters may be displayed in a list on a subscreen. Alternatively, information of the player characters displayed in a list on the subscreen may be the player character names and the bodily powers and the magical powers of the player characters. As a result, it is possible to notify the player properly of the information necessary for investigating the alternations of the player characters.

Furthermore, according to the third aspect, the program may further cause a computer to restore the positions of alternated characters between the participating and standby player characters for a scene such as a battle scene in response to the operation of a player after alternations. As a result, it is possible to proceed the character alternations smoothly and easily.

According to the third aspect, moreover, the program may further cause a computer to allow actions of a player having participated in a scene such as a battle scene by using alternations, when the alternations are completed. It is possible to allow a player character, as alternated to participate in the scene, to act and to instantly participate in the scene so that a player's interest can be prevented from lessening.

Furthermore, according to the third aspect, the program may further cause a computer to display the action orders of all characters including player characters and an enemy character participating in a scene such as a battle scene. As a result, it is possible to allow the player characters to transition smoothly and strategically as the scene develops by making the best use of the individual features of the player characters.

According to a fourth aspect of the invention, there is provided a video game processing apparatus including a storage system that stores a program of a video game to control a scene such as a battle scene on a screen between multiple player characters and at least one enemy character. The apparatus also includes a computer for executing the program read out from the storage system and a display unit provided as the output of the computer for the screen display. The computer executes the program to allow at least one of the player characters to participate in the scene. The program also allows the display of a list of standby player characters not participating in the scene in a subscreen. The subscreen display being in response to the operation of a player while some of the player characters participating in the scene are awaiting a command input. The program also allows the selection of any of the player characters displayed in the subscreen in response to the operation of the player. The program additionally allows the substitution of an optionally selected player character for the player character awaiting the command input in exchanging the participation in and the standby player characters for the scene.

According to this fourth aspect, the procedure to alternate player characters in a state awaiting, command input is accepted so that after the characters alternate, the characters can instantly participate in a scene such as a battle scene to prevent a player's interest from lessening.

According to this fourth aspect, in a scene such as a battle scene, player characters may accept command input in accordance with orders and in response to operation of a player. It is possible to select actions for the individual player characters to execute, thereby, to make finer settings and to participate in a more systematic battle.

According to the fourth aspect, moreover, information of player characters may be displayed in a list on a subscreen. Alternatively, information of the player characters displayed in the list on the subscreen may be the player character names and the bodily powers and the magical powers of the player characters. As a result, it is possible to notify the player properly of the information necessary for investigating the alternations of the player characters.

Furthermore, according to the fourth aspect, the program may further cause a computer to restore positions of the alternated characters between the participation in and the standby player characters for a scene such as a battle scene in response to the operation of a player after alternations. As a result, it is possible to proceed the character alternations smoothly and easily.

According to the fourth aspect, moreover, the program may further cause a computer to allow actions of a player having participated in a scene such as a battle scene by using alternations, when the alternations are completed. It is possible to allow a player character, as alternated to participate in the scene, to act and to instantly participate in the scene so that a player's interest can be prevented from lessening.

Furthermore, according to the fourth aspect, the program may further cause a computer to display the action orders of all characters including player characters and an enemy character participating in a scene such as a battle scene. As a result, it is possible to allow the player characters to transition smoothly and strategically as the scene develops by making the best use of the individual features of the player characters.

According to a fifth aspect of the invention, there is provided a computer-readable recording medium having a program of a video game recorded to allow multiple players to participate in a video game through a network and to control a scene such as a battle scene on a screen between multiple player characters and at least one enemy character. The program causes the computer to allow at least one of the player characters to participate in the scene and display a list of standby player characters not participating in the scene, in a subscreen in response to the respective operations of the multiple players while any of the player characters participating in said battle scene is awaiting a command input. The program also includes the ability to select any of the player characters displayed in the subscreen, in response to the respective operations of the multiple players. The program additionally includes the ability to substitute an optionally selected player character for the player character awaiting the command input in exchanging the participation in and the standby player characters for the scene.

According to this fifth aspect, it is possible to provide a recording medium having a program in which a procedure to alternate the player characters in the state awaiting command input is accepted. The recording medium also having a program in which after the characters alternate so that the characters can instantly participate, in a scene such as a battle scene to prevent a player's interest from lessening.

According to a sixth aspect of the invention, there is provided a program of a video game for allowing multiple players to participate in the video game through a network and for controlling a battle scene on a screen between multiple player characters and at least one enemy character, wherein said program causes a computer to allow some of the player characters to participate in the battle scene. The program also causes a computer to display a list of standby player characters not participating in a scene such as a battle scene, in a subscreen in response to the individual operations of the multiple players while any of the player characters participating in said battle scene is awaiting a command input. The program also allows the computer to select any of the player characters displayed in the subscreen in response to the individual operations of the players, and to substitute the optionally selected player character for the player character awaiting the command input between the participation in and the standby characters for the scene.

According to a seventh aspect of the invention, there is provided a video game processing method for allowing multiple players to participate in a video game through a network and for controlling a scene such as a battle scene on a screen between multiple player characters and at least one enemy character. The method allowing at least one of the player characters to participate in a scene such as a battle scene and displaying a list of standby player characters not participating in the battle scene in a subscreen in response to the individual operations of the multiple players while any of the play characters participating in the scene is awaiting a command input. The method also includes selecting any of the player characters displayed in the subscreen in response to the individual operations of the players and substituting an optionally selected player character for the player character awaiting the command input in exchanging the participation in and the standby player characters for the scene.

According to an eighth aspect of the invention, there is provided a video game processing apparatus with a storage system that stores a program that allows multiple players to participate in the video game through a network and to control a scene such as a battle scene on a screen between multiple player characters and at least one enemy character.

The apparatus also includes a computer for executing a program read from the storage system and a display unit provided as the output of the computer for the screen display, wherein the computer executes the program. The program allows at least one of the player characters to participate in the scene and to display a list of standby player characters not participating in the battle scene in a subscreen in response to the individual operations of the multiple players while any of the player characters participating in said battle scene is awaiting a command input. The program also allows the selection of any of the player characters displayed in the subscreen in response to the individual operations of the multiple players and the substitution of an optionally selected player character for the player character awaiting the command input in exchanging the participation in and the standby player characters for the scene.

According to the sixth, seventh and eighth aspects, the procedure to alternate the player characters in the state awaiting the command input is accepted so that after the character alternations, the characters can instantly participate, after being alternated, in the scene such as a battle to prevent a player's interest from lessening.

DESCRIPTION OF THE PREFERRED EMBODIMENTS

Figure 1:
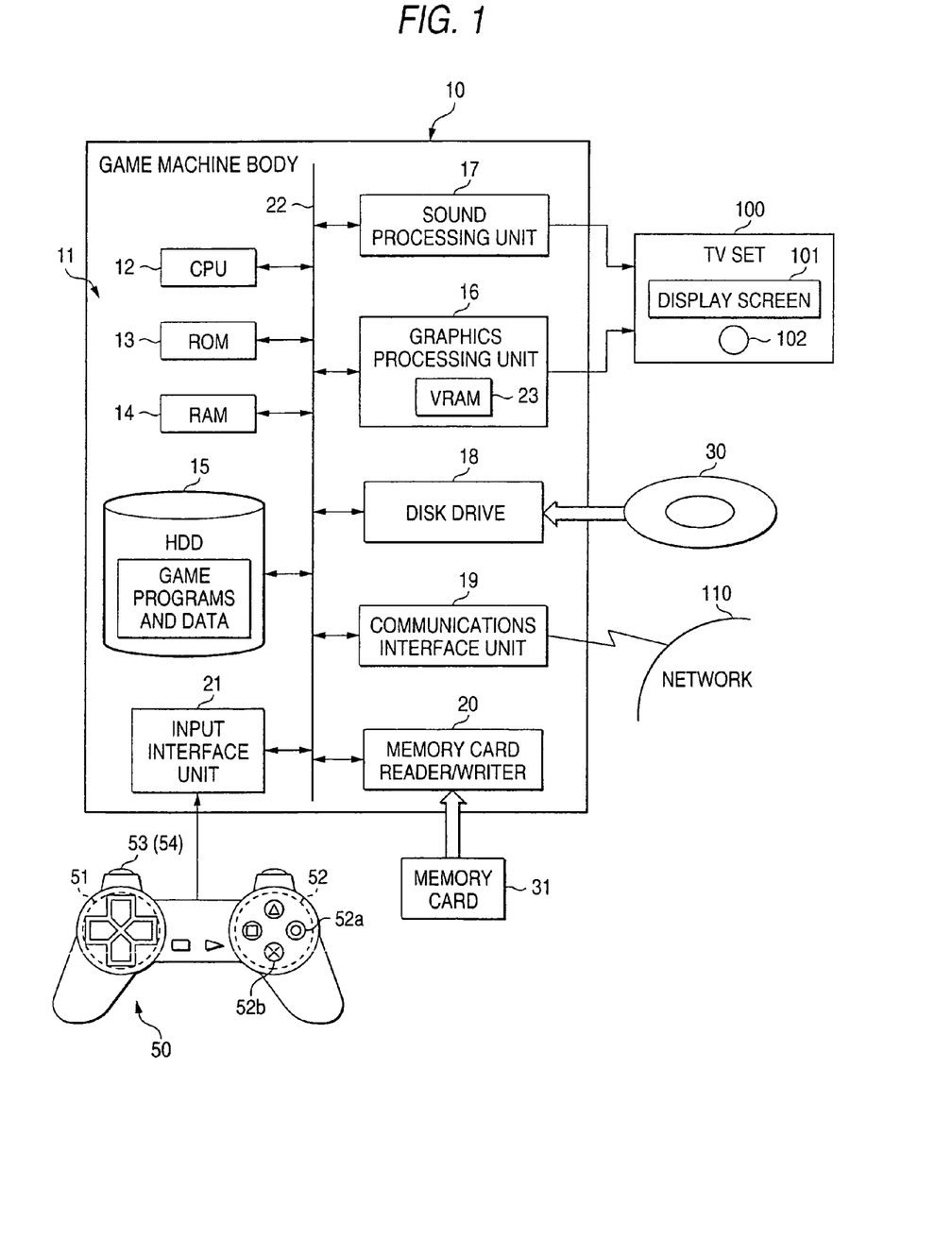
FIG. 1 is a block diagram showing an overall construction of a first embodiment of the invention.

With reference to the accompanying drawings, a first embodiment in which the invention is applied to a home video game machine is described. FIG. 1 is a block diagram showing the entire construction of the video game machine according to the first embodiment of the invention.

First described is the video game machine according to the first embodiment of the invention. The video game machine 10 is constructed, as shown in FIG. 1, to include a game machine body 11 and a keypad 50 connected with the input side of the game machine body 11. A TV set 100 including a CRT (Cathode Ray Tube) and a speaker, etc. is connected with the output side of the game machine body 11.

The game machine body 11 includes a CPU (Central Processing Unit) 12, a ROM (Read Only Memory) 13, a RAM (Random Access Memory) 14, a hard disk drive 15, a graphics processing unit 16, a sound processing unit 17, a disk drive 18, a communications interface unit 19, a memory card reader/writer 20 and an input interface unit 21, and further includes a bus 22 connecting those components. The game machine body 11 is also connected through the input interface unit 21 with the keypad 50 acting as an operation input unit.

On the upper face of the keypad 50, there are arranged a cross key 51 and a button group 52, which is equipped with an O button 52a and an X-button 52b. Multiple button groups are arranged on the side portion of the keypad 50, and an L1 button 53 and an L2 button 54 are vertically arranged on the side portion of the cross key 51. Keypad 50 is equipped with switches which are associated individually with the cross key 51, the L1 button 53, the L2 button 54 and the button group 52. When these individual buttons are pushed, the corresponding switches are turned ON. The keypad 50 creates a detection signal corresponding to the ON/OFF of each of those switches.

The detection signal created in the keypad 50 is fed to the input interface unit 21, through which it becomes detection information indicating what button on the keypad 50 is turned ON. Thus, an operation command given to the keypad 50 by the user is fed to the game machine body 11.

The CPU 12 executes an operating system stored in the ROM 13, to control the entire game machine centrally, and executes the programs of the video game stored in the program region of the RAM 14. Furthermore, the CPU 12 monitors the operation state of the keypad 50 through the input interface 21, to execute, if necessary, the program of the video game stored in the program region of the RAM 14, and to store, if necessary, a predetermined region of the RAM 14 with the various data which have developed in the progress of the game. The ROM 13 includes an EEPROM (Electrically Erasable and Programmable Read Only Memory) which is stored, at a stage before the power is cut off, with such predetermined data of the RAM 14 as have to be stored and hold even when the power is cut off.

The RAM 14 includes a program region, an image data region and a voice data region mainly and a region for storing other data. These individual regions are stored with the program data, the image data, the voice data and the remaining data, which are read out from a disk 30 such as a DVD or a CD-ROM by the disk drive 18, respectively.

Furthermore, the RAM 14 is used as a work area, too, and its region for storing the remaining data is stored with the various data which have developed in the progress of the game. Here, the program data, the image data, the voice data and the remaining data, as read out from the disk 30, can be stored in the hard disk drive 15 so that the program data, the image data, the voice data and the remaining data once stored in the hard disk drive 15 may be transferred, if necessary, to the RAM 14, or so that the various data once stored in the RAM 14 and having developed in the progress of the game may be transferred to and stored in the hard disk drive 15.

The graphics processing unit 16 includes a frame buffer as a buffer memory for storing the image data in a VRAM 23, to create a video signal on the basis of the image data stored in the frame buffer by the control information from the CPU 12 in accordance with the program execution and to output the video signal to the TV set 100. As a result, a screen by the image data stored in the frame buffer is displayed in a screen display unit 101 of the TV set 100.

The sound processing unit 17 has a function to create a voice signal such as background music (BGM), a conversation between characters and an effect sound, etc. The sound processing unit 17 is caused, by the control information from the CPU 12 in accordance with the program execution, to output a sound signal including the voice signal to a speaker 102 of the TV set 100 on the basis of the data stored in the RAM 14.

The TV set 100 includes the screen display unit 101 and the speaker 102, and performs the graphics (image) display and the voice output according to the content of the video game on the basis of the video signal (graphics signal) and the sound signal from the game machine body 11.

The disk drive 18 is so constructed that it can set the disk (DVD or CD-ROM) 30 or the recording medium removably, and reads the program data, the image data, the voice data and the remaining data of the video game, as stored in the disk 30.

The communications interface unit 19 is connected with a network 110 so that it acquires various data by performing data communications, if necessary, with the data storage or information processor of the server of the game server group 8 or another server or the like. Here, the program data, the image data, the voice data and the remaining data of the video game, as read out from the disk 30 and stored in the RAM 14, may be acquired through the network 110 and the communications interface unit 19.

The memory card reader/writer 20 is so constructed that it can set a memory card removably, and save data of a relatively small capacity such as progress data of the video game or environment setting data of the video game are written in the memory card.

In the recording medium, i.e., the disk 30 according to the first embodiment of the invention, there is recorded the program of the video game for controlling a battle scene between multiple player characters and at least one enemy character on the screen. The program can be read out by a computer (the CPU 12 and its peripheral units). This computer is enabled by the program read in: to cause some of the player characters to participate in the battle scene; to display a list of standby player characters, who do not participate in the battle scene, in a subscreen in response to the operation of the player while any of the player characters participating in the battle scene is awaiting a command input; to select any from the player characters displayed in the subscreen, in response to the operation of the player; and to substitute the optionally selected player character for the player character awaiting the command input in exchanging their standpoints of the participation in and the standby for the battle.

This computer is further enabled after the player characters have alternated to return the alternated positions of the characters between the participation in and the standby player characters for the scene such as a battle scene to the original ones in response to the operation of the player, and to enable the player having participated in the scene by the alternation to act. The computer is further enabled to display the action orders of all characters including the player characters and the enemy character participating in the scene.

Therefore, the game machine body 11 is provided, by the software processing of the CPU 12 and based on the data stored in the individual memories, with not only the function necessary for executing the video games of the prior art but also: the function to display the list of the standby player characters not participating in the battle screen in the subscreen in response to the operation of the player; the function to substitute the positions of a predetermined player character for the player characters awaiting the command input in exchanging the participation in and the standby player characters for the battle in response to the operation of the player; and the function to return the positions of the characters between the participation in and the standby for the battle in response to the operation of the player after the player characters are alternated.

The game machine body 11 is further provided with: the function to enable the player characters allowed to participate in the scene such as a battle scene by the alternation to act after the completion of the alternation of the player characters; and the function to display the action orders of all the player characters including the player characters and the enemy character participating in the scene.

Therefore, it is possible to realize the video game in which the standby player character can participate in the scene instantly as the player character and the standby player character are exchanged and in which the operation procedure of the alternation is so simple that it will not deteriorate the player's interest. Here, these functions may be realized not by the software processing, but by providing a dedicated hardware.

Figure 2:
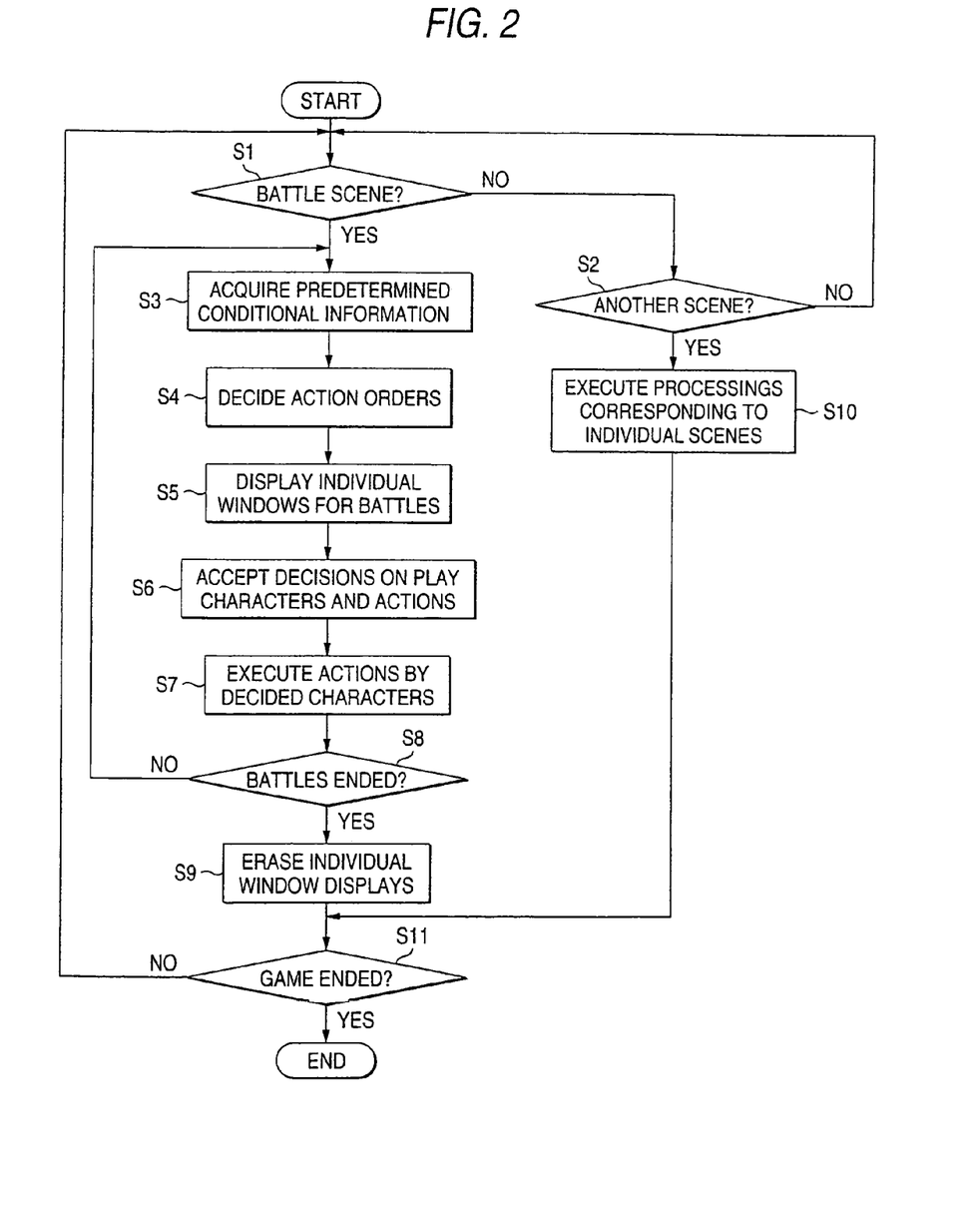
FIG. 2 is a flow chart showing exemplary overall processing of the first embodiment of the invention.

Here will be described the actions of the first embodiment thus constructed. FIG. 2 is a schematic flow chart showing one example of an overall processing routine of the actions of the aforementioned embodiment. Here, the individual steps in FIG. 2 are designated by Step S1 to Step S11 as reference characters.

First, when the power is turned ON, although omitted from FIG. 2, the boot program is read out to initialize the individual units so that the processing is executed to start the game. By the disk drive 18, specifically, the program data, the image data, the voice data and the remaining data of the video game, as stored in the disk (DVD or CD-ROM) 30 are read out and stored in the RAM 14. Prior to the actual progress of the game, the various settings are made to cause a game progressing state. When the game is progressed in this state, a battle scene or another scene is established to transfer the routine to Step S1.

At Step S1, it is decided whether or not the scene is the battle scene. If not the battle scene, the routine transfers to Step S2, at which it is decided whether or not the scene is another (movements, conversations or shoppings). If not another scene, the routine is again returned to Step S1, and the operations of Step S1 and Step S2 are repeated for a standby state.

If it is decided at Step S1 that the scene is the battle scene, moreover, the routine transfers to Step S3, at which predetermined information to be used for action order decisions are acquired. As the predetermined information to be used for the action order decisions, specifically, there are acquired: information preset according to the actions for the player characters to execute; information preset according to the characteristics given to the individual characters in the screen being displayed; and information preset according to the individual statuses of the characters, as having developed in the game progress.

When the predetermined information to be used for those action order decisions are acquired, the action orders are decided at Step S4. Specifically, the operations are executed using the predetermined information acquired; the action orders of the multiple characters in the screen being displayed, are decided on the basis of the operation results; and the decision results are stored and held in the RAM 14. When the action order decisions are completed at Step S4, the routine transfers to Step S5, at which individual windows for battles are displayed.

Then, the routine transfers to Step S6, at which time the decisions on the player characters and actions are accepted.

If the player characters have to be alternated, they are alternated, and actions (or commands) to be executed by the player characters in accordance with the selecting operation of the player are decided. When the play characters and actions are decided, the routine transfers to Step S7, at which actual actions (or commands) are executed. When the actions are executed, the routine transfers to Step S8, at which it is decided whether or not the battle is ended. If it is decided at Step S8 that the battle is not ended because all the enemy characters could not be knocked down by this attack, the routine is returned again to Step S3 so that the aforementioned operations of Step S3 to Step S8 are repeated.

If it is decided at Step S8 that the battle is ended because all the enemy characters could be knocked down by this attack, the routine transfers to Step S9, at which time the individual window displays for the battle are erased, and further to Step S11. If it is decided at Step S2 that the scene is another, on the other hand, the routine transfers to Step S10, at which processings corresponding to the individual scenes are executed, and further to Step S11. At Step S11, it is decided whether or not the game is ended. If it is decided that the game is not ended, the routine is returned again to Step S1, and the aforementioned operations of Step S1 to Step S11 are repeated. If it is decided at Step S11 that the game is ended, moreover, the various operations accompanying the game end are done, and the game is ended.

Figure 3:
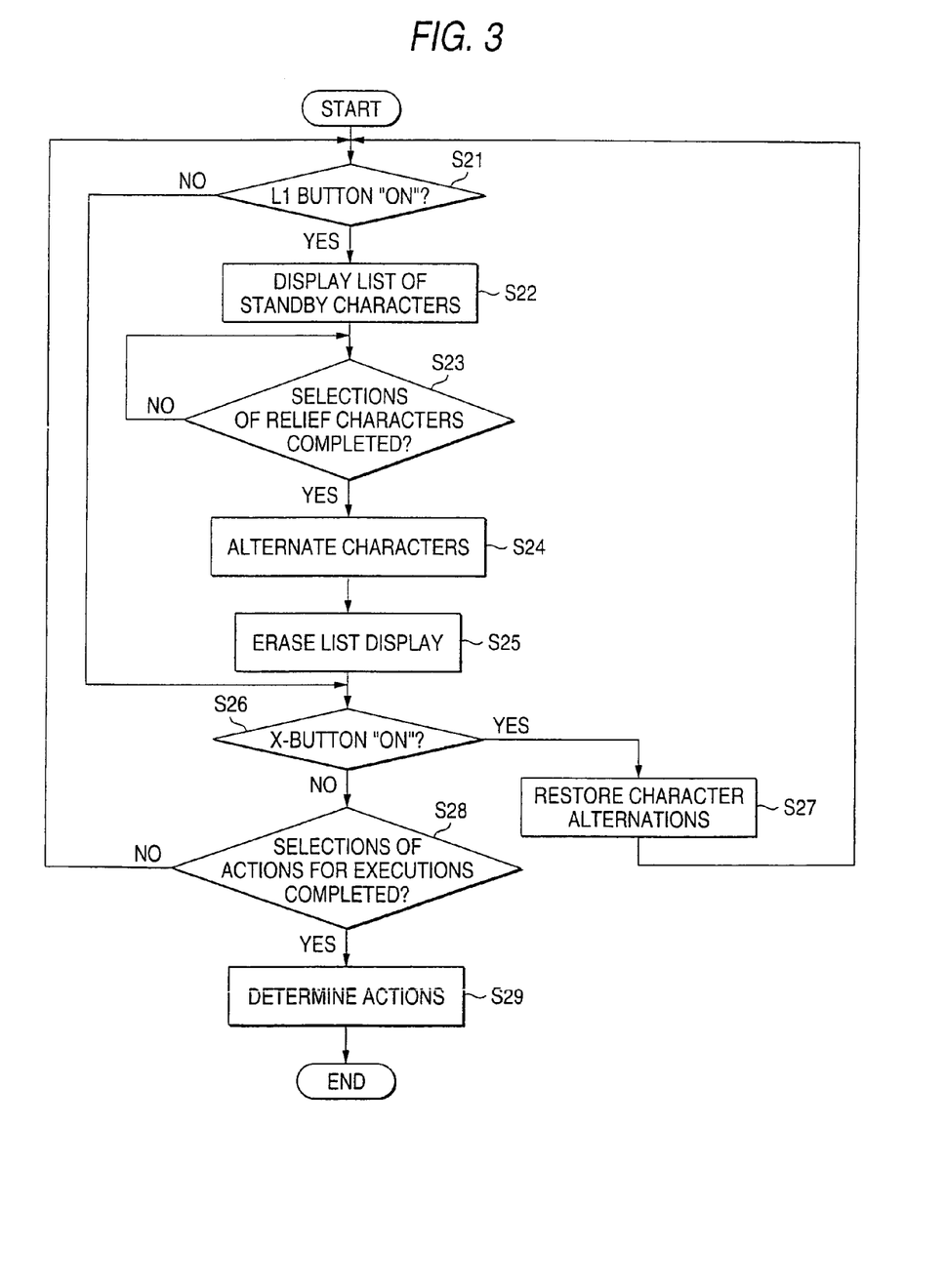
FIG. 3 is a flow chart showing exemplary overall acceptances of the decisions on the player characters and actions in the first embodiment of the invention.

FIG. 3 is a schematic flow chart showing one example of a processing routine of accepting the decisions (Step S6) on the player characters and actions in the first embodiment thus far described. Here, the individual steps in FIG. 3 are designated by Step S21 to Step S29 as reference characters.

Figure 4A:
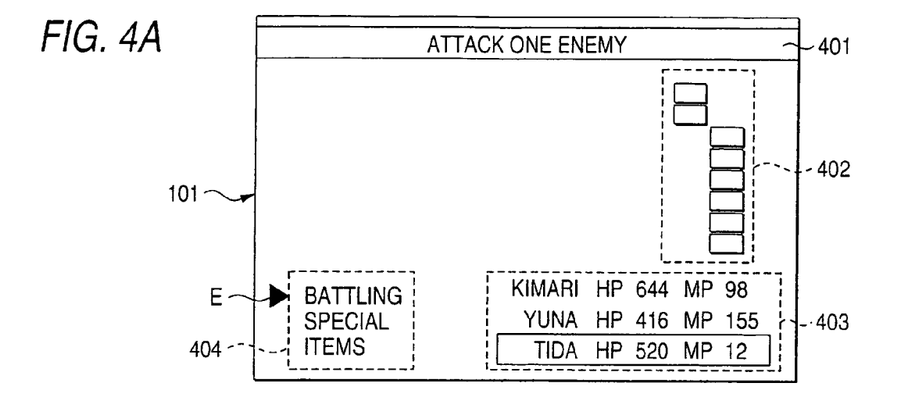
FIG. 4A is an explanatory diagram showing one example of the display screen in the acceptances of the decisions on the player characters and actions in the first embodiment of the invention.
Figure 4B:
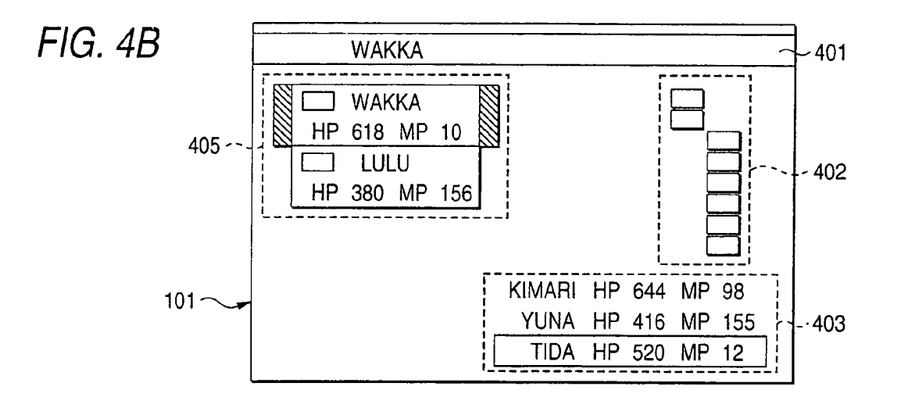
FIG. 4B is an explanatory diagram showing one example of the display screen in the acceptances of the decisions on the player characters and actions in the first embodiment of the invention.
Figure 4C:
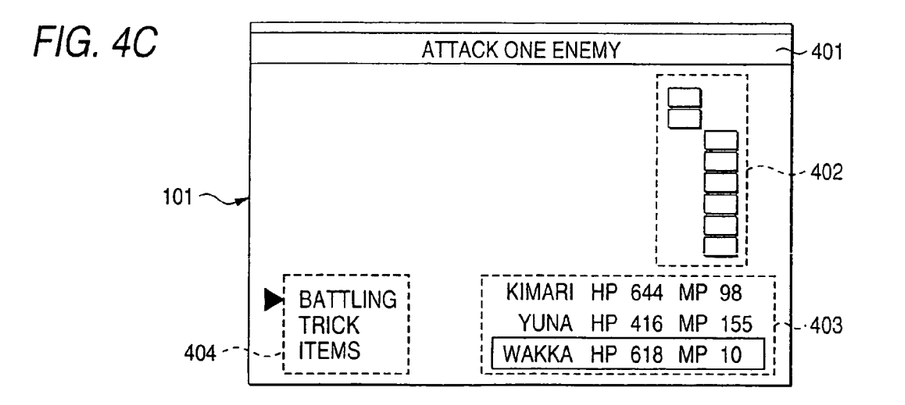
FIG. 4C is an explanatory diagram showing one example of the display screen in the acceptances of the decisions on the player characters and actions in the first embodiment of the invention.

FIGS. 4A, 4B and 4C show specific examples of the display screens in the acceptances of the decisions on the player characters and actions. Regarding the operation indications, there are used the L1 button 53 and the X-button 52*b* of the aforementioned keypad 50. The L1 button 53 functions as a button for the procedure to alternate the player characters whereas the X-button 52*b* functions as a button for canceling the alternation.

At first, it is assumed that, at the stage before the transfer to the acceptance of the decisions on the player characters and actions, as has been described herein before, the individual windows for the battle are displayed, as shown in FIG. 4A. Here in FIG. 4A, numeral 401 designates a window for displaying a message, and numeral 402 designates a window for displaying an action order. In FIG. 4A, moreover, numeral 403 designates a window for displaying the character data, and numeral 404 designates a window for displaying a command menu.

When the routine transfers to the step of accepting the decisions on the player characters and actions, moreover, it is decided at Step S21 whether or not the L1 button 53 is pushed. If it is decided that the L1 button 53 is not pushed, the routine transfers to Step S26, at which it is decided whether or not the X-button 52*b* is pushed. If it is decided that the X-button 52*b* is not pushed, the routine transfers to Step S28, at which it is decided whether or not the selections of the actions to be executed by the player characters being manipulated are completed. If it is decided whether or not the selections of the actions to be executed by the player characters are not completed, the routine is returned again to Step S21, and the operations of Step S21, Step S26 and Step S28 are repeated to a standby state.

In this state, the L1 button 53 is pushed; the X-button 52*b* is pushed; or the actions to be executed by the player characters are selected. If it is decided at Step S21 that the L1 button 53 is pushed, moreover, the routine transfers to Step S22, at which a list of the standby player characters is displayed, as shown in FIG. 4B. As shown in FIG. 4B, specifically, there are displayed in a window 405 the names of the standby player characters, and corresponding information (e.g., the numerical values indicating a bodily power (HP) or a magical power (MP)) indicating the characteristics of the characters.

When the list display is completed, the routine transfers to Step S23, at which it is decided whether or not the selection operations of relief characters are completed. When the cursor is moved when the cross key 51 is moved so that the O button 52*a* is pushed, for example, the routine transfers, while assuming that the selections of the relief characters are ended, to Step S24. At this time, the player characters are alternated, and the information indicating the characters alternated are stored and held in the predetermined region of the RAM 14. Specifically, the play character now playing is changed to a relief one, and the play character in relief is changed to the play one and is stored and held. Here in FIG. 4B, it is indicated that the "TIDA" in the lowermost step is playing and that the "WAKKA" is being selected as the relief player from the standby player characters.

When the alternations of the characters are completed, the routine transfers to Step S25, at which the display of the list of standby player characters is erased, as shown in FIG. 4C, and it is indicated the present player character is the "WAKKA". When the erasure of the list table is completed, the routine transfers to Step S26, at which time the L1 button 53 is pushed, the X-button 52*b* is pushed, or the standby state is continued until the selection of the actions for the player characters is executed.

If it is decided at Step S26 that the X-button 52B is pushed, moreover, the routine transfers to Step S27, at which time the characters are alternated. Specifically, there are read out the information indicating the relations of the changed characters which are stored and held in the predetermined data region of the RAM 14 and which are alternated at this time. On the basis of this information, the play characters having been alternated by the character alternation are returned to the original state.

In the case shown in FIG. 4C, specifically, the "WAKKA" or the player character to be alternated at this time is returned to the relief, and the "TIDA" is returned to the player character to restore the state shown in FIG. 4A. When the character alternations are completed, the routine is returned to Step S21, at which time the L1 button 53 is pushed, the X-button 52*b* is pushed, or the standby state continues until the selections of the actions for the player characters execute.

If it is decided at Step S28 that the selections of the actions for the player characters being manipulated to execute are completed, the routine transfers to Step S29. Here, it is decided, when the cursor is moved by the cross key 51 so that the O button 52*a* is pushed, that the selections of actions are completed, and the routine transfers to Step S29. At Step S29, the processing for executing the determined actions (or commands) is made to end the series of decision acceptances of the play characters and actions.

In other words, at the instant the routine transfers to the acceptances of decisions on the player characters and actions, there prevails the standby state in which the operations of Step S21, Step S26 and Step S28 are repeated until the L1 button 53 is pushed, until the X-button 52*b* is pushed or until the actions for the player characters to execute are selected. The routine does not transfer to the individual steps before any operation is done.

After the completion of the alternations of the player characters, the characters are instantly enabled to participate in the battle by doing predetermined actions or to restore their relations by alternating themselves. At the player character alternating time, moreover, there are displayed on the common screen the action orders of the individual characters, the data of the playing characters, the names of the standby player characters, and the data of the characters. Therefore, the player can make proper decisions on the selections of the player characters to be alternated, from the various data presented.

Therefore, the first embodiment thus far described has the following effects. According to the first effect, the procedure to alternate the player characters in the state awaiting the command input is accepted. After the character alternations, a shift is made to the state in which the actions of the player characters can be executed so that the characters can instantly participate in the battle to prevent a player's interest from lessening.

Moreover, the actions for the individual player characters to execute can be selected to perform in a more detailed setting and systematic battle.

Furthermore, the character names of the standby characters and the information indicating the characteristics of the characters are displayed in a list so that the player can confirm the states of the player characters easily and quickly.

Still moreover, the predetermined buttons can function as those to alternate and cancel the characters so that the procedure to alternate the characters can be smoothly and easily done.

While grasping the future development on the basis of the display of the action orders, the player characters are enabled to act smoothly and strategically by making the best use of the individual features of the multiple player characters.

Here, the foregoing first embodiment has been described on the case in which there are accepted the operation commands to determine the actions of the player characters and the action orders by using the cursor key 51, the O button 52a, the X-button 52b and the L1 button 53 of the keypad 50. However, it is acceptable to use other buttons. Also described is the case in which the operation commands are accepted by monitoring only the timings to push the O button 52a, the X-button 52b and the L1 button 53. However, it is acceptable to accept the operation commands by using the OFF timing of the switch associated with a predetermined button and to accept the operation commands by monitoring and combining both the ON and OFF timings of the switch associated with a predetermined button. It is further acceptable to allow acceptance of the operation commands setting the alternating time periods for which the switch associated with a predetermined button is ON and OFF.

Figure 5:
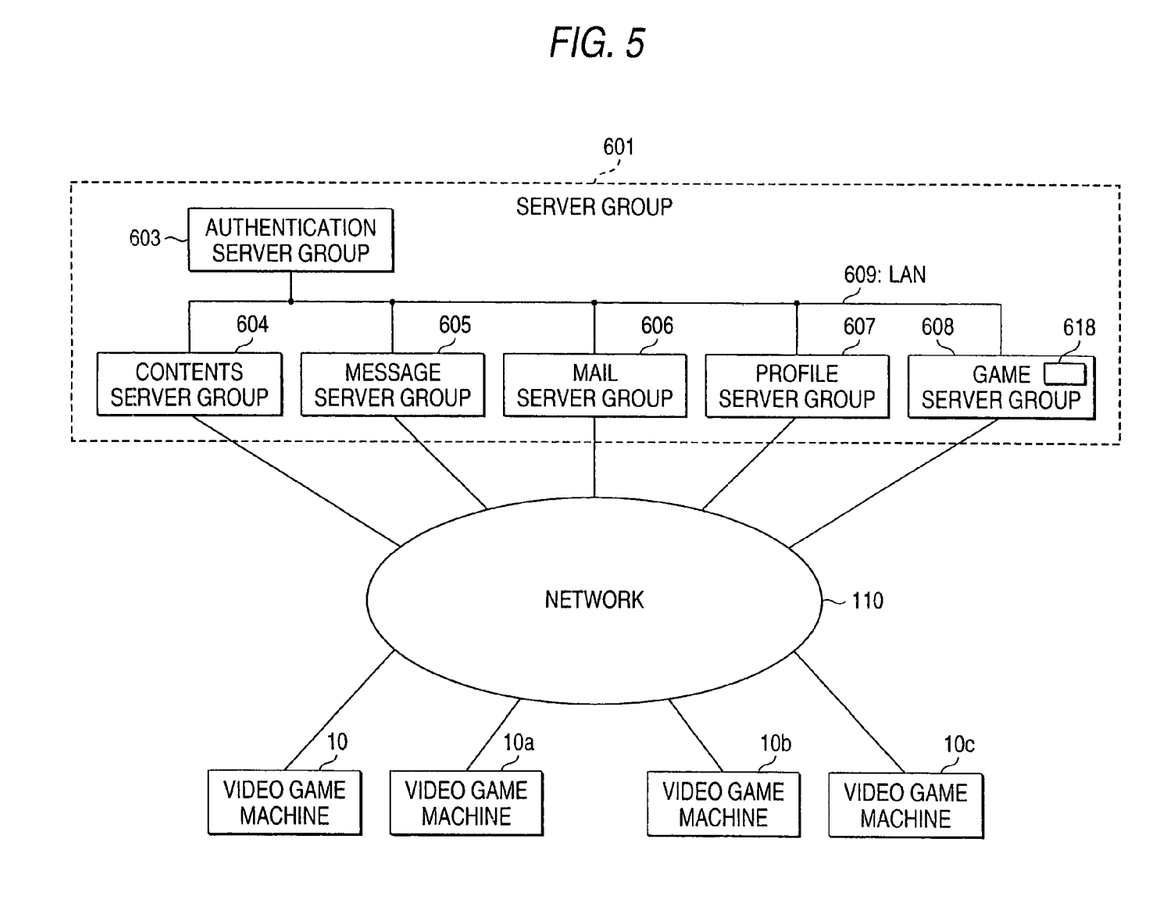
FIG. 5 is an explanatory diagram showing exemplary overall construction of a second embodiment of the invention.

With reference to the accompanying drawings, here will be described a second embodiment in which the invention is applied to a game system including a game server and a video game machine. FIG. 5 is an explanatory diagram showing the entire construction of a game system according to the second embodiment of the invention.

First of all, is described the game system according to the second embodiment of the invention. Numeral 110 in FIG. 5 designates a network including the internet. With the network 110, as shown in FIG. 5, there are connected a server group 601 of an internet service provider (as will be simply abbreviated into the "ISP") and video game machines 10, 10a, 10b, 10c, . . . , and so on. Here, the video game machine 10 is the video game machine of the foregoing first embodiment.

The server group 601 of the ISP is constructed to include: an authentication server group 603 for account administrations for user authentications; a contents server group 604 for providing perusal services of contents such as voices or motion pictures; a message server group 605 for providing environments of chats or messengers; a mail server group 606 for providing services of electronic mails; a profile server group 607 for administrating profiles of users; and a game server group 608 for providing game environments. These server groups 603 to 608 are individually connected with one another through a LAN 609.

Where the video game machine is to be connected with a predetermined server of the server group 601 of the ISP thus constructed, an access is made from the video game machine through the network 110 to the authentication server group 603 by internet protocols so that a menu screen is received by acquiring the authentication of the principal. When the player on the side of the video game machine selects the individual services displayed in the menu screen, moreover, the video game machines 10, 10a, 10b, 10c, . . . , and so on are individually connected with the server groups matching the services so that the various services can be provided.

Specifically, the game server group 608 includes a game progressing server 618 for progressing the online game. This server 618 is connected, when the game start is selected, with an arbitrary one of the video game machines 10, 10a, 10b, 10c, . . . , and so on so that a game screen is displayed in the display unit on the side of the video game machine with which the server 618 is connected. Then, the game is progressed while processing the demands in parallel from the individual video game machines connected. In this game progressing state, there is displayed in the screen not only the player character of the player himself or herself but also the character of another player who simultaneously participates in the game.

The video game machines 10, 10a, 10b, 10c, . . . , and so on thus constructed and the server 618 connected through the network can be individually deemed as one video game processing apparatus, so that their memory regions can be freely shared and used and so that their share of the individual CPUs can be combined in any manner by the programs read out.

In the recording medium according to the second embodiment of the invention, there are recorded the program of the video game, in which the multiple players can participate through the network so that the battle scene between the multiple player characters and at least one enemy character is controlled on the screen and which can be read out by the computer (i.e., the composite of the individual CPUs of the video game machines 10, 10a, 10b, 10c, . . . , and so on, the CPU of the server 618 and their peripheral circuits).

The computer is enabled, according to the program to allow some of player characters to participate in a battle scene. The program also enables the computer to display a list of standby player characters not participating in a scene such as a battle scene, in a subscreen in response to the individual operations of the multiple players while any of the player characters having participated in the scene is awaiting a command input; to select any of the player characters displayed in the subscreen, in response to the individual operations of the multiple players; and to substitute the optionally selected player character for the player characters awaiting the command input in exchanging the participation in and the standby for the scene.

The computer is further enabled to restore the positions of the alternated characters between the participation in and the standby player characters for the scene such as a battle scene in response to the individual operations of the multiple players after the play characters were alternated, and to allow the actions of the player alternated to participate in the scene, when the alternations of the player characters are completed. The computer is further enabled to display the action orders of all the characters including the player characters and the enemy character participating in the scene. Therefore, the computer has functions similar to those of the foregoing embodiment 1 and attains effects similar to those of the first embodiment even in the video game in which the multiple players participate through the network.

Here, it is apparent that the invention should not be limited to the aforementioned individual embodiments but could be suitably modified in individual embodiments within the scope of the technical concept thereof. Moreover, the common components in the individual Figures are designated by the identical reference numerals.

According to the invention, as has been described hereinbefore, the battling player character and the standby character can participate instantly as they are alternated, and the operations of the alternating procedure can be so simple as to prevent the interest from lowering.

What is claimed is:

1. A computer-readable recording medium having such a program of a video game recorded to control a battle scene on a screen between a plurality of player characters and at least one enemy character,
    wherein said program causes the computer:
    to allow at least one of said player characters to participate in the battle scene;
    to display a list of standby player characters not participating in the battle scene, in a subscreen in response to only a single step operation of a player when a player character participating in said battle scene is awaiting a command input;
    to select any of the player characters displayed in the subscreen, in response to the operation of the player; and
    to substitute an optionally selected player character and said player character awaiting the command input.

2. The computer-readable recording medium according to claim 1, wherein in said battle scene, the player characters accept the command input in accordance with action orders and in response to the operation of the player.

3. The computer-readable recording medium according to claim 1, wherein the information of the player characters are displayed in a list on said subscreen.

4. The computer-readable recording medium according to claim 3, wherein the information of the player characters displayed in the list on said subscreen comprise player character names and bodily powers and magical powers of the player characters.

5. The computer-readable recording medium according to claim 1, wherein said program further causes said computer to restore the positions of the alternated characters between the participating and the standby player characters for said battle in response to the operation of the player after said alternations.

6. The computer-readable recording medium according to claim 1, wherein said recorded program further causes said computer to allow the actions of the player character participating in the battle by said alternations, when said alternations are completed.

7. The computer-readable recording medium according to claim 1, wherein said recorded program further causes said computer to display the action orders of all the characters including the player characters and the enemy character participating in the battle.

8. A program of a video game for controlling a battle scene on a screen between a plurality of player characters and at least one enemy character,
    wherein said program causes a computer:
    to allow at least one of said player characters to participate in the battle scene;
    to display a list of standby player characters not participating in the battle scene, in a subscreen in response to only a single step operation of a player when a player characters participating in said battle scene is awaiting a command input;
    to select any of the player characters displayed in the subscreen, in response to the operation of the player; and
    to substitute an optionally selected player character for said player character awaiting the command input.

9. The program according to claim 8, wherein in said battle scene, the player characters accept the command input in accordance with action orders and in response to the operation of the player.

10. The program according to claim 8, wherein the information of the player characters are displayed in a list on said subscreen.

11. The program according to claim 10, wherein the information of the player characters displayed in the list on said subscreen comprise player character names and bodily powers and magical powers of the player characters.

12. The program according to claim 8, wherein said program further causes said computer to restore the positions of the alternated characters between the participating and the standby player characters for said battle in response to the operation of the player after said alternations.

13. The program according to claim 8, wherein said program further causes said computer to allow the actions of the player having participated in the battle by said alternations, when said alternations are completed.

14. The program according to claim 8, wherein said program further causes said computer to display the action orders of all the characters including the player characters and the enemy character participating in the battle.

15. A video game processing method for controlling a battle scene on a screen between a plurality of player characters and at least one enemy character, comprising:
    allowing at least one of said player characters to participate in the battle scene;
    displaying a list of standby player characters not participating in the battle scene in a subscreen in response to only a single step operation of a player when a player characters participating in said battle scene is awaiting a command input;
    selecting any of the player characters displayed in the subscreen, in response to the operation of the player; and
    substituting said optionally selected player character for said player character awaiting the command input.

16. The video game processing method according to claim 15, wherein in said battle scene, the player characters accept the command input in accordance with action orders and in response to the operation of the player.

17. The video game processing method according to claim 15, wherein the information of the player characters is displayed in a list on said subscreen.

18. The video game processing method according to claim 17, wherein the information of the player characters displayed in the list on said subscreen comprises player character names and bodily powers and magical powers of the player characters.

19. The video game processing method according claim 15, further comprising:
   restoring the positions of the alternated characters between the participating and the standby player characters for said battle in response to the operation of the player after said alternations.

20. The video game processing method according to claim 15, further comprising:
   allowing the actions of the player having participated in the battle by said alternations, when said alternations are completed.

21. The video game processing method according to claim 15, further comprising:
   displaying the action orders of all the characters including the player characters and the enemy character participating in the battle.

22. A video game processing apparatus comprising:
   a storage system that stores a program of a video game to control a battle scene on a screen between a plurality of player characters and at least one enemy character;
   a computer that executes the program read from said storage system; and
   a display unit provided as the output of said computer for the screen display,
   wherein said computer executes said program:
   to allow at least one of said player characters to participate in the battle scene;
   to display a list of standby player characters not participating in the battle scene, in a subscreen in response to only a single step operation of a player when a player characters participating in said battle scene is awaiting a command input;
   to select any of the player characters displayed in the subscreen, in response to the operation of the player; and
   to substitute an optionally selected player character for said player character awaiting the command input.

23. The video game processing apparatus according to claim 22, wherein in said battle scene, the player characters accept the command input in accordance with the action orders and in response to the operation of the player.

24. The video game processing apparatus according to claim 22, wherein the information of the player characters are displayed in a list on said subscreen.

25. The video game processing apparatus according to claim 24, wherein the information of the player characters displayed in the list on said subscreen comprise player character names, bodily powers, and magical powers of the player characters.

26. The video game processing apparatus according to claim 22, wherein said computer further executes said program to restore the positions of the alternated characters between the participating and the standby player characters for said battle in response to the operation of the player after said alternations.

27. The video game processing apparatus according claim 22, wherein said computer further executes said program to allow the actions of the player having participated in the battle by said alternations, when said alternations are completed.

28. The video game processing apparatus according to claim 22, wherein said computer further executes said program to display the action orders of all the characters including the player characters and the enemy character participating in the battle.

29. A computer-readable recording medium having a program of a video game recorded to allow a plurality of players to participate in the video game through a network and to control a battle scene on a screen between a plurality of player characters and at least one enemy character,
   wherein said program causes the computer:
   to allow at least one of said player characters to participate in the battle scene;
   to display a list of standby player characters not participating in the battle scene, in a subscreen in response to only a single step operations of one of the players when a player characters participating in said battle scene is awaiting a command input;
   to select any of the player characters displayed in the subscreen, in response to the operations of the players; and
   to substitute an optionally selected player character for said play character awaiting the command input.

30. A program of a video game for allowing a plurality of players to participate in the video game through a network and for controlling a battle scene on a screen between a plurality of player characters and at least one enemy character,
   wherein said program causes a computer:
   to allow at least one of said player characters to participate in the battle scene;
   to display a list of standby player characters not participating in the battle scene, in a subscreen in response to only a single step operation of one of the multiple players when a player character participating in said battle scene is awaiting a command input;
   to select any of the player characters displayed in the subscreen, in response to the individual operations of the multiple players; and
   to substitute an optionally selected player character for said player character awaiting the command input.

31. A video game processing method that allows a plurality of players to participate in the video game through a network and for controlling a battle scene on a screen between a plurality of player characters and at least one enemy character, comprising:
   allowing at least one of said player characters to participate in the battle scene;
   displaying a list of standby player characters not participating in the battle scene, in a subscreen in response to only a single step operation of one of the multiple players when a player character participating in said battle scene is awaiting a command input;
   selecting any of the player characters displayed in the subscreen, in response to the individual operations of the multiple players; and
   substituting an optionally selected player character for said player character awaiting the command input.

32. A video game processing apparatus comprising:
   a storage system that stores a program to allow a plurality of players to participate in a video game through a network and to control a battle scene on a screen between a plurality of player characters and at least one enemy character;
   a computer for executing a program read from said storage system; and
   a display unit provided as an output system of said computer for the screen display,
   wherein said computer executes said program:

to allow at least one of said player characters to participate in the battle scene;

to display a list of standby player characters not participating in the battle scene, in a subscreen in response to only a single step operation of one of the multiple players when a player character participating in said battle scene is awaiting a command input;

to select any of the player characters displayed in the subscreen, in response to the individual operations of the multiple players; and to substitute an optionally selected player character for said player character awaiting the command input.

* * * * *

UNITED STATES PATENT AND TRADEMARK OFFICE
CERTIFICATE OF CORRECTION

PATENT NO. : 7,001,271 B2
APPLICATION NO. : 09/964793
DATED : February 21, 2006
INVENTOR(S) : T. Nakazawa et al.

It is certified that error appears in the above-identified patent and that said Letters Patent is hereby corrected as shown below:

At column 16, line 15 of the printed patent, "characters" should be --character--.

At column 16, line 54 of the printed patent, "characters" should be --character--.

At column 18, line 14 of the printed patent, "operations" should be --operation--.

At column 18, line 15 of the printed patent, "characters" should be --character--.

At column 18, line 21 of the printed patent, "play" should be --player--.

Signed and Sealed this

Thirty-first Day of October, 2006

JON W. DUDAS
*Director of the United States Patent and Trademark Office*